United States Patent [19]

Lang

[11] Patent Number: 5,494,724
[45] Date of Patent: Feb. 27, 1996

[54] WASHABLE, WATER AND DIRT BINDING SERVICE MAT

[75] Inventor: Aage Lang, Kolind, Denmark

[73] Assignee: Milliken Denmark A/S, Mörke, Denmark

[21] Appl. No.: 269,515

[22] Filed: Jul. 1, 1994

Related U.S. Application Data

[60] Continuation of Ser. No. 925,671, May 29, 1992, which is a division of Ser. No. 702,747, May 20, 1991, abandoned.

[30] Foreign Application Priority Data

May 21, 1990 [DK] Denmark ................... 1250/90

[51] Int. Cl.$^6$ .................... B32B 3/02; D04H 1/04
[52] U.S. Cl. .................... 428/95; 425/85; 425/296
[58] Field of Search .................... 428/95, 85, 296

[56] References Cited

U.S. PATENT DOCUMENTS

| | | | |
|---|---|---|---|
| 3,306,808 | 2/1967 | Thompson et al. | 428/95 |
| 3,535,192 | 10/1970 | Gamble | 428/95 |
| 3,955,022 | 5/1976 | Sands | 428/95 |
| 4,053,668 | 10/1977 | Kimmel et al. | 428/95 |
| 4,062,993 | 12/1977 | Seward | 428/95 |
| 4,069,361 | 1/1978 | Kumar | 428/95 |
| 4,096,302 | 6/1978 | Thibodeau et al. | 428/95 |
| 4,107,361 | 8/1978 | Parker | 428/95 |
| 4,123,577 | 10/1978 | Port et al. | 428/95 |
| 4,267,220 | 5/1981 | Yagi et al. | 428/96 |
| 4,565,063 | 1/1986 | Stalder et al. | 57/328 |
| 4,707,895 | 11/1987 | Lang | 428/95 |
| 4,917,932 | 4/1990 | McClung | 428/95 |
| 5,024,868 | 6/1991 | Petersen | 428/95 |

OTHER PUBLICATIONS

Webster's German & English Dictionary; p. 320;1 "Vlies".

*Primary Examiner*—George F. Lesmes
*Assistant Examiner*—Terrel Morris
*Attorney, Agent, or Firm*—Terry T. Moyer; Earle R. Marden

[57] ABSTRACT

A washable, water and dust binding service mat having a nap and a rubber or plastics backing layer, whereby the nap and a woven ground fabric for the tufting is fastened in the backing layer material, the ground fabric for the tufting comprising a layer of woven primary fabric of synthetic split fibers being calendered together by a heat setting operation with a layer of a nonwoven fiber fleece which prior to this heat setting operation has been needled together with the woven primary fabric by a needle technique. The nonwoven fiber fleece has an area weight of 80–150 grams/m$^2$, consists of two or more kinds of synthetic fibers, with one having a softening temperature lower than the other synthetic fiber.

5 Claims, No Drawings

WASHABLE, WATER AND DIRT BINDING SERVICE MAT

This application is a continuation of pending prior application Ser. No. 07/925,671, filed on May 29, 1992, of Aage Lang for WASHABLE WATER AND DIRT BINDING SERVICE MAT, which in turn is a division of U.S. application Ser. No. 07/702,747, filed May 20, 1991, now abandoned.

The present invention relates to a washable, water and dirt binding service mat having a nap and a rubber or plastics backing layer, whereby the nap and a woven substrate for the tufting thereof is fastened in the backing layer material.

Service mats are known having a nap which wholly or partly consist of a cotton yarn or a synthetic yarn being secured to the backing layer via a woven substrate, to which the nap is secured by a known tufting technique. The yarns with the substrate to which they are fastened, are usually fastened to the backing layer by heat treatment or another adhesive bonding or binding technique. A disadvantage by said service mat is that the remaining quantity of water after the washing and centrifugation process is rather considerable and must be removed by a subsequent drying operation at correspondingly high energy consumption costs.

Danish Patent No. 150,061 corresponding to U.S. Ser. No. 373,688, filed Apr. 30, 1982, discloses a service mat eliminating said disadvantage by replacing the woven substrate by a more specified non-woven substrate which apparently causes an increased draining of the nap by a capillary effect or wick effect. A disadvantage by said mat is, however, that for obtaining its necessary stability a rather stiff or thick backing layer should be used.

It is also known in the manufacture of nap carpets to use a socalled woven primary fabric as a substrate for the tufting, whereby the primary fabric after having been tufted with yarns, is normally provided with a precoat for binding the warps and weft threads of the primary fabric, whereby a cutting fastness is almost obtained.

Said known primary fabric consists of a woven polypropylene yarn, and said precoat consists of a latex, such as SBR (styrene butadiene rubber) or CSBR (carboxylated styrene butadiene rubber) or mixtures thereof with chalk as a filler. The woven primary fabric has a softening point of 110–140 degrees C., normally 120 degrees C.

Said technique cannot be applied for service mats because the precoat used increases the total weight of the primary fabric to an unacceptable extent, about 100 to 2300 g per square meter.

It is also known in the production of napped carpet in order to reduce the nop number per square meter and thus to obtain a reduction of the yarn quantity per square meter without the carpet thus manufactured being marred by the woven backing having a colour which differs from the yarns, to use a backing of a weight of 120–140 g per square meter consisting of a primary fabric serving as ground texture for tufting, to which a non-woven nylon fleece of nylon 6 or nylon 6/6, 30–40 g per square meter, preferably 25 g per square meter has been needled by a needle technique, whereupon the backing by calandering has been exposed to a heat setting operation. Said layer of nylon fleece may now be dyed together with the applied nap yarns and is thus hiding the woven primary fabric, so that the colour thereof which possibly differs from the yarns, cannot mar the finished carpet product, although the number of nops has been reduced. Said technique cannot be applied for service mats having a rubber backing, seeing that the woven backing is destroyed during the vulcanization of the rubber.

It is the purpose of the invention to reduce or eliminate said disadvantages and to provide a service mat of the kind set forth which is lighter.

This purpose is achieved by the substrate for the tufting comprising a layer of woven primary fabric of synthetic split fibres being calandered together by a heat setting operation with a layer of a non-woven fiber fleece which prior to this heat setting operation has been needled together with the woven primary fabric by needle technique, so that 10–30%, preferably 15–20% of the fibre fleece by the needling operation is needled through the primary fabric and thus after the needling process is partly located on the rear side of the primary fabric, and wherein the layer of the non-woven fiber fleece has an area weight of 80–150 g per square meter, preferably 90–110 g per square meter, and consists of two or more kinds of synthetic fibres, of which at least one kind in a part by weight of the fiber fleece layer of 20–30% should be compatible, i.e. reconcilable in its softened condition with the fibres of the primary fiber and have a softening point of 110–140 degrees C., preferably 120 degrees C., and at least one second kind of fibre in a part by weight of the fleece layer of 70–80% having a softening point of 180–240 degrees C., preferably 210 degrees C.

Thereby the substrate for tufting obtain a high binding or cohesive strength without the use of latex, styrene butadiene rubber, carboxylated styrene butadiene rubber and the like adhesion agents, since the synthetic fiber part of the lowest softening point in the non-woven fleece during the manufacture of the substrate for tufting by the calandering process becomes plastified and forms binding fibres for mutual fastening of said layer. Furthermore, the substrate retains a high water sorbtion capacity due to the unplastified second synthetic fiber part having the highest softening point in the fleece layer. The tear strength of the substrate becomes 30–50% higher than for the hitherto known substrate with a high liquid drain capacity during centrifugation, and the substrate obtains so high a deformation resistance that the backing layer of the mat may be made thinner without the total tear strength of the mat and its deformation stability becoming less than for the prior known service mats having a high liquid sorption and liquid drain capacity. This is presumably due to the fact that the deformation stability of the substrate has turned out to be higher than the sum of the deformation stabilities of the fabric layer and the non-woven fleece layer.

It is also important by the manufacture of the mat that the substrate thus becomes easy to handle and presents no risk for loosening of the warps and weft threads in the woven primary fabric. Said high thread fastness is achieved due to the large quantity of fibres from the fleece layer which fibres are bonded or fastened in the substrate, because the woven primary fabric is effectively locked after the needle stitching by the thermoplastic adhesion, i.e. heat setting provided by the calandering process.

Furthermore it is achieved that the substrate may endure a high process temperature as the one applied by the heat welding or vulcanization process of the service mat, whereby the substrate, the nap tufted therein and the rubber or plastic backing layer are vulcanized together to a finished mat. This is surprisingly due to the fact that the part of synthetic fibres having the highest softening point in the non-woven fleece seems to provide a protection against re-melting of the part of synthetic fibres having a low softening point in the non-woven fleece and in the woven primary fabric during the heat welding or vulcanizing process. Said protection presumably derives from the rather high softening point of 180–240 degrees C. of the applied kind of synthetic fibres and/or its specific heat.

As a consequence of the high tear resistance and deformation stability of the substrate the backing layer of the mat may be relatively thin, causing a weight and material saving for the service mat as a whole, and thus without reducing the total deformation stability or the liquid absorption capacity during the use of the mat.

The invention also relates to a process for manufacturing of service mats of the kind mentioned in the preamble of this specification, by which process a woven substrate is tufted with pile or nap nops, before it is fastened to a backing layer of rubber or plastic by means of an adhesive operation. In accordance with said method the substrate is manufactured by the following steps: in a woven primary fabric of synthetic split fibres, such as polyamide, polyester and/or polypropylene is by needle technique fastened non-woven fleece having an area weight of 80–150 g per square meter, preferably 90–110 g per square meter, and consisting of two or more kinds of synthetic fibres, of which at least one kind in a part by weight of 20–30% of the fleece layer should be reconcilable or compatible in its softened condition with the fibres of the primary fabric and should have a softening point of 110–140 degrees C., preferably 120 degrees C., and at least one second kind of fibres in a part by weight of 70–80% and having a softening point of 180–240 degrees C., preferable 210 degrees C., whereupon the woven primary fabric and the fleece layer needled therein are calandered together during a heat setting operation for forming the substrate, which then is tufted with nap or pile nops, before the substrate thus provided with a nap is fastened to the backing layer by an adhesive bonding or binding operation, whereby the needling by the needle technique is performed so that 10–30%, preferably 15–20% of the fibre fleece by the needling are needled through the primary fabric and consequently after the needling process is partly located on the rear side of the primary fabric.

If e.g. the woven primary fabric—also known as the polyback—consists of synthetic fibres of polypropylene split fibres having a softening point of 110–140 degrees C., good results are obtained with a non-woven fleece layer consisting of 25 weight per cent polypropylene fibres and 75 weight per cent polyester fibres.

As examples of the primary fabric of synthetic split fibres may be mentioned polyamides, polyesters, polypropylenes and polymer thermoplastic materials of similar characteristics. As examples of adhesive operations which may be applied in the process of the invention may be mentioned vulcanization, hot melt bonding, adhesive adhesion and similar operations for fastening the nap provided ground fabric to the backing layer.

I claim:

1. A washable, water and dirt binding service mat comprising: a woven substrate, pile yarns tufted into said substrate and a polymeric backing layer connected to the back of said substrate, said substrate having a woven fabric of synthetic fibers heat-set, calendered and needled to a nonwoven fleece, said nonwoven fleece having 10–30% of its fibers needled through said woven fabric and projecting from the other side thereof, said nonwoven fleece having a weight of 80–150 grams/m$^2$ and consisting of at least two different fibers, one fiber being about 20–30% by weight of said fleece and having a softening temperature in the range of 110°–140° C. and reconcilable in its softened condition with the fibers of said woven fabric while the other of said two fibers has a softening temperature in the range of 180°–240° C.

2. The mat of claim 1 wherein the amount of fibers needled through said woven fabric is 15–20%.

3. The mat of claim 1 wherein the weight of the nonwoven fleece is in the range of 90–110 grams/m$^2$.

4. The mat of claim 3 wherein the softening temperature of said one fiber is about 120° C.

5. The mat of claim 4 wherein the softening temperature of said other fiber is about 210° C.

* * * * *